US011199618B2

(12) United States Patent
Wang et al.

(10) Patent No.: US 11,199,618 B2
(45) Date of Patent: Dec. 14, 2021

(54) RADAR ANTENNA ARRAY

(71) Applicant: Apple Inc., Cupertino, CA (US)

(72) Inventors: Jian Wang, Cupertino, CA (US); Gregory E. Rogers, San Jose, CA (US)

( * ) Notice: Subject to any disclaimer, the term of this patent is extended or adjusted under 35 U.S.C. 154(b) by 252 days.

(21) Appl. No.: 16/310,109

(22) PCT Filed: Jun. 16, 2017

(86) PCT No.: PCT/US2017/037848
§ 371 (c)(1),
(2) Date: Dec. 14, 2018

(87) PCT Pub. No.: WO2017/218876
PCT Pub. Date: Dec. 21, 2017

(65) Prior Publication Data
US 2020/0096626 A1    Mar. 26, 2020

Related U.S. Application Data

(60) Provisional application No. 62/351,733, filed on Jun. 17, 2016.

(51) Int. Cl.
G01S 13/42 (2006.01)
G01S 13/44 (2006.01)
G01S 13/931 (2020.01)

(52) U.S. Cl.
CPC ........ G01S 13/426 (2013.01); G01S 13/4454 (2013.01); G01S 13/931 (2013.01); G01S 2013/93271 (2020.01)

(58) Field of Classification Search
CPC ... G01S 13/426; G01S 13/4454; G01S 13/931
(Continued)

(56) References Cited

U.S. PATENT DOCUMENTS

| 4,336,540 A | 6/1982 | Goodwin et al. | |
|---|---|---|---|
| 2012/0105268 A1* | 5/2012 | Smits | G01S 7/025 342/22 |

(Continued)

FOREIGN PATENT DOCUMENTS

| DE | 102011113015 | 3/2013 |
|---|---|---|
| DE | 102014118031 | 6/2016 |

OTHER PUBLICATIONS

Parker, Michael, "Radar Basics—Part 3: Beamforming and radar digital processing," EE Times, Jun. 10, 2011, http://www.eetimes.com/document.asp?doc_id=1278838, accessed Jun. 6, 2016, 9 pages.
(Continued)

*Primary Examiner* — Bo Fan
(74) *Attorney, Agent, or Firm* — Polsinelli PC

(57) ABSTRACT

Implementations described and claimed herein provide systems and methods for obstacle detection. In one implementation, a beam is transmitted at an elevation orientation from a transmit array system. The transmit array system includes transmit antenna arrays each having one or more transmit antennas. Target scatter is received at a receive array system including one or more receive channels. A virtual array is synthesized for the elevation orientation from an incidence of the target scatter on each of the one or more receive channels for each of the one or more transmit antennas. The virtual array has a size corresponding to the one or more transmit antenna arrays convolved with the receive array system. Four dimensional space information is generated from the virtual array, and any obstacles along a travel path are detected from the four dimensional space information.

19 Claims, 13 Drawing Sheets

(58) Field of Classification Search
USPC .......................................... 342/156, 22, 59
See application file for complete search history.

(56) References Cited

U.S. PATENT DOCUMENTS

| | | |
|---|---|---|
| 2015/0253420 A1 | 9/2015 | Alland |
| 2016/0025839 A1 | 1/2016 | Trummer |
| 2016/0146931 A1* | 5/2016 | Rao ..................... H01Q 1/3233 342/59 |

OTHER PUBLICATIONS

Wang et al., U.S. Appl. No. 15/339,513, filed Oct. 31, 2016.

* cited by examiner

RADAR ANTENNA ARRAY

CROSS-REFERENCE TO RELATED APPLICATIONS

The present application claims the benefit of priority under 35 U.S.C. § 119(e) to U.S. Provisional Application No. 62/351,733, entitled "Radar Antenna Array," filed on Jun. 17, 2016, which is incorporated by reference in its entirety herein.

FIELD

Aspects of the present disclosure relate to radar detection and more particularly to systems and methods for detecting obstacles along a travel path using a radar antenna array system.

BACKGROUND

Obstacles along a travel path of a vehicle are challenging to avoid. These challenges are further exacerbated in the context of an autonomous device, including automobiles, robots, aerial vehicles, and the like. More particularly, before an autonomous device can avoid an obstacle, the autonomous device first detects the obstacle and determines a course of action for avoiding the obstacle. Conventional detection systems often emphasize the reduction of complexity and cost at the expense of high resolution, accuracy, and probability of detection. Such detection systems thus suffer from false alarms due to irrelevant targets, such as debris, road clutter, overhead bridges, and the like, that are not obstacles to the operation of the autonomous vehicle along the travel path. It is with these observations in mind, among others, that various aspects of the present disclosure were conceived and developed.

SUMMARY

Implementations described and claimed herein address the foregoing problems by providing a radar antenna array system with enhanced object detection for a vehicle. In one implementation, a beam is transmitted at an elevation orientation along a travel path from a transmit array system. The transmit array system includes a transmit antenna array having one or more transmit antennas. Target scatter is received at a receive array system. The target scatter is propagated from the beam off one or more objects in an environment associated with the travel path. The receive array system is in a parallel orientation with the transmit array system and includes one or more receive channels each having a sub-array with at least one element. A virtual array is synthesized for the elevation orientation from an incidence of the target scatter on each of the one or more receive channels for each of the one or more transmit antennas. The virtual array has a size corresponding to the transmit antenna array convolved with the receive array system. Four dimensional space information is generated for the environment by taking a transform across the virtual array, and any obstacles are detected along the travel path in the one or more objects from the four dimensional space information.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the presently disclosed technology relate to systems and methods for obstacle detection along a travel path. Generally, a vehicle, such as an autonomous vehicle or a semiautonomous vehicle, includes a detecting system having a radar antenna array system that provides 360 degrees of coverage with true range-azimuth-elevation-Doppler 4 dimensional space, while minimizing cost and complexity. The radar antenna array system has enhanced resolutions, particularly in the azimuth and elevation dimensions with further coverage (e.g., up to approximately 300 meters) and increased probability and accuracy for detecting obstacles along the travel path of the autonomous device without false alarms. Such obstacles may include, without limitation, other vehicles, pedestrians, signs, guardrails, road infrastructure, and other objects that would prevent or otherwise inhibit an operation of the vehicle along the travel path. Irrelevant targets may include, for example, debris, road clutter, overhead bridges, and other objects that are not obstacles to the operation of the vehicle along the travel path. The radar antenna array system may be used to facilitate autonomous driving and/or in conjunction with autonomous or semiautonomous features, such as adaptive cruise control, emergency breaking, blind spot detection, and other driver assistance systems.

The various systems and methods disclosed herein generally provide for obstacle detection along a travel path. The example implementations discussed herein reference obstacle detection for a vehicle, such as an autonomous or semiautonomous automobile. However, it will be appreciated by those skilled in the art that the presently disclosed technology is applicable in other obstacle detection contexts and to other devices, including, without limitation, robots, unmanned aerial vehicles, underwater vehicles, rovers, and other autonomous or semiautonomous vehicles or devices.

Figure 1:
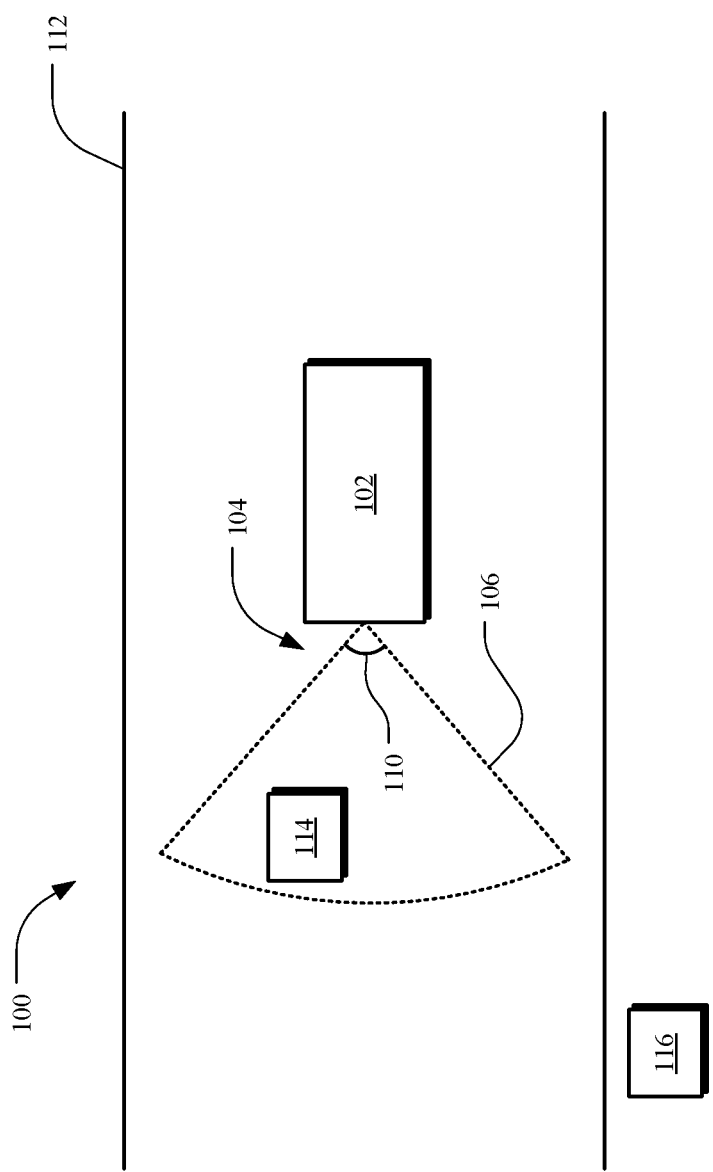
FIG. 1 is a diagram of a top view of an example detection system having a radar antenna array system for detecting an obstacle along a travel path of a vehicle.
Figure 2:
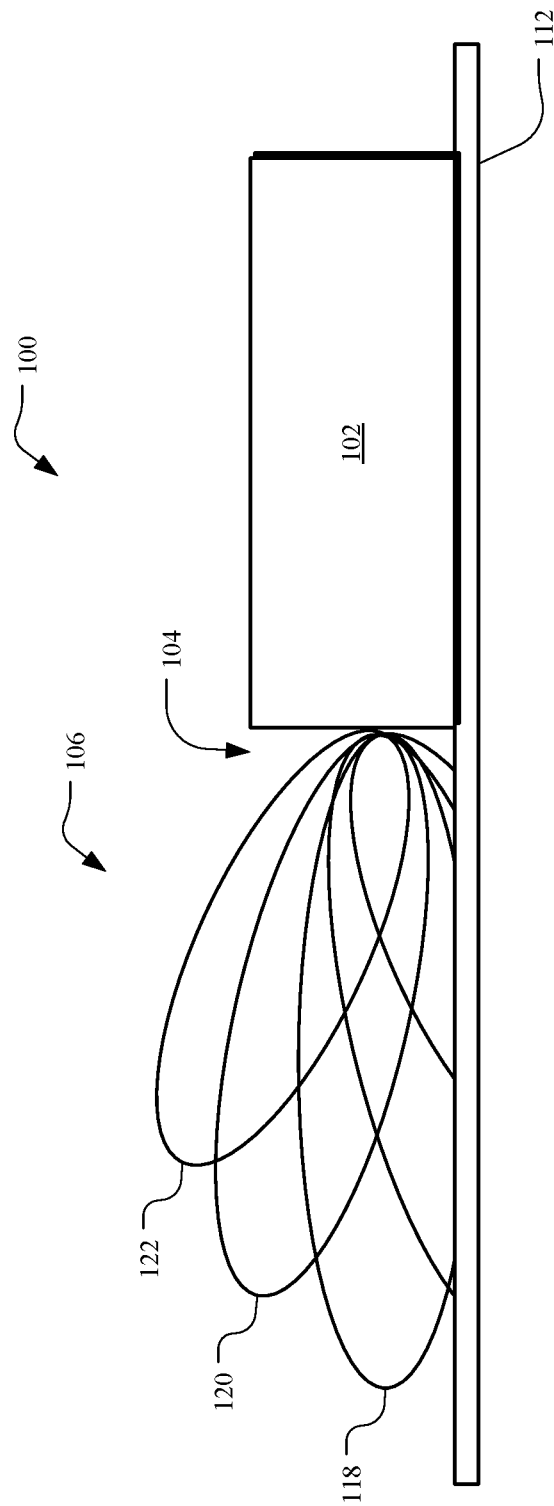
FIG. 2 illustrates a side view of the detection system of FIG. 1.

To begin a detailed description of an example detection system 100 having a radar antenna array system 104 for detecting an obstacle along a travel path of a vehicle 102, reference is made to FIGS. 1 and 2. In one implementation, the radar antenna array system 104 is disposed at a front of the vehicle 102 and generates a beam 106 along the travel path into which the vehicle 102 is moving. Stated differently, the radar antenna array system 104 generates the beam 106 in a forward direction relative to the vehicle 102 as it travels along the travel path. In one implementation, the beam 106 has wide horizontal beam width 110 and a narrow vertically scanning beam. In one particular example, the horizontal beam width is approximately 100 degrees, and the vertical beam width is approximately 13 degrees. The radar antenna array system 104 receives fan beam scanning in elevation, with the vertical beam width defining a vertical resolution.

As shown in FIG. 2, the beam 106 may be shifted among or otherwise pointed to each of a plurality of elevation orientations (e.g., 118-122) as the vehicle 102 moves along a travel path on a travel surface 112, such as a road, path, trail, or the like. In one implementation, the elevation orientations are dictated by the vertical beam width. For example, where the vertical beam width is 13 degrees, the elevation orientations may include, a first elevation orientation 118 is at 0 degrees, a second elevation orientation 120 is at 13 degrees, a third elevation orientation is at 26 degrees, with other elevation orientations at −13 degrees and −26 degrees. Scattered energy from objects (e.g., 114, 116) in the beam 106 propagates back to the radar antenna array system 104, where it is captured and processed for obstacle detection. In one implementation, the radar antenna array system 104 provides sparse road beams for road contour analysis and ego velocity determination. An automatic transmit power control (ATPC) may be used to limit road beam detections to the travel path 112, thereby irrelevant targets that are not obstacles to the operation of the vehicle 102 along the travel path, such as the object 116.

To further distinguish objects to detect obstacles to the operation of the vehicle 102 along the travel path, such as the object 114, in one implementation, the radar antenna array system 104 utilizes transmit array antennas and electronically steered digital receive arrays to achieve coverage in both azimuth and elevation. For example, the azimuth coverage may be approximately 100 degrees, with the elevation coverage being approximately 60 degrees. As described herein, the radar antenna array system 104 achieves enhanced azimuth resolution with minimized hardware cost, as well as increased resolution in the elevation domain.

More particularly, the radar antenna array system 104 senses an environment of the travel path of the vehicle 102 with a wide field of view and coverage in range, azimuth, and elevation space and with increased accuracy, resolution and confidence (probability of detection). In one implementation, the radar antenna array system 104 extends the field of view to approximately 300 meters in range, 100 degrees in azimuth, and 60 degrees in elevation, thereby covering the elevation space and the azimuth plane with enhanced accuracy, resolution, and probability of detection in range, azimuth, elevation, and Doppler domain Stated differently, the radar antenna array system 104 provides coverage for object detection in four-dimensional (4D) space.

Conventionally, radar detection systems have one or more modes, such as long range and medium range. Long range radar (LRR) generally provides coverage around 200-250 meters with a narrow field of view of less than 20 degrees in azimuth, while medium range radar has a detection coverage of 60-70 meters with a field of view of 90 degrees in azimuth. In other words, because the approach is often to increase the gain of the system by increasing the aperture size, conventional systems often widen the field of view at the expense of range or extend the range at the expense of field of view width. Such conventional systems are thus three-dimensional (3D) radar systems with range, azimuth, and Doppler dimensions. The information on elevation is accordingly limited with no practical resolution to resolve multiple targets in elevation. For example, the angular resolution of long rage radar is typically 2.5-3 degrees, and the angular resolution of medium range radar is typically 5-6 degrees.

The radar antenna array system 104 solves these problems by extending the range while maintaining a wide field of view and improving the angular resolution by an order of magnitude. In one implementation, the radar antenna array system 104 includes a number of real aperture radars or channels and synthesizes a virtual aperture through digital signal processing techniques, including, but not limited to, multi-input/multi-output (MIMO). The large virtual aperture stitched together through MIMO provides a high angular resolution and high loop gain. The use of individual channels having a wide field of view and synthesizing the virtual aperture permits the radar antenna array system 104 to maintain a wide field of view.

The radar antenna array system 104 thus provides improved detection range, field of view, probability of detection, and high resolution in the range, azimuth, elevation, Doppler 4D space of obstacles on the travel surface 112 (e.g., the object 114) surrounding the ego vehicle 102. High accuracy as well as high-resolution in 4D space provides situational awareness around the ego vehicle 102 with high confidence and high fidelity to guide the vehicle 102 along the travel path through complex environments.

Figure 3:
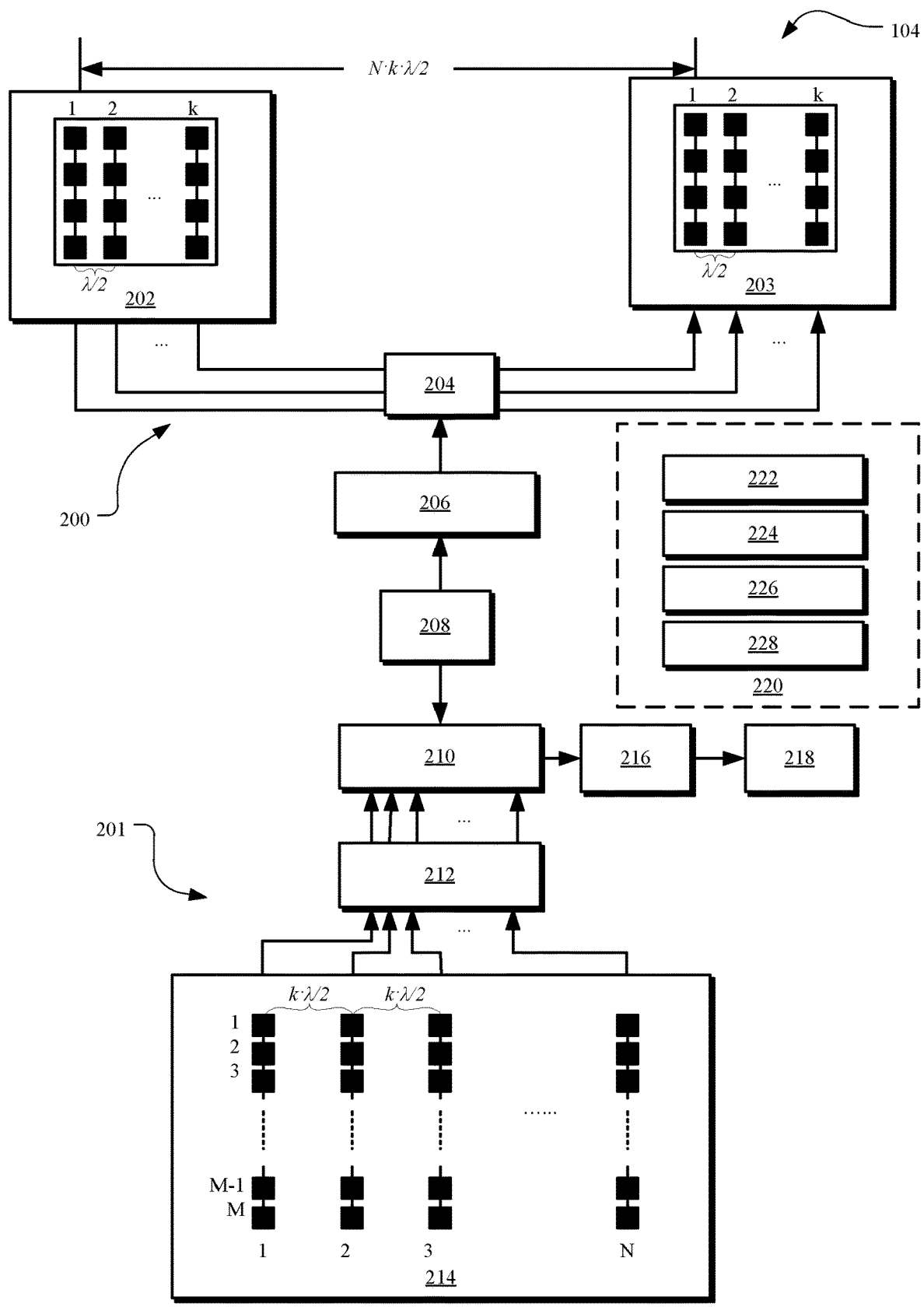
FIG. 3 is a block diagram of an example radar antenna array system configured for single waveform sequential transmitting.
Figure 4:
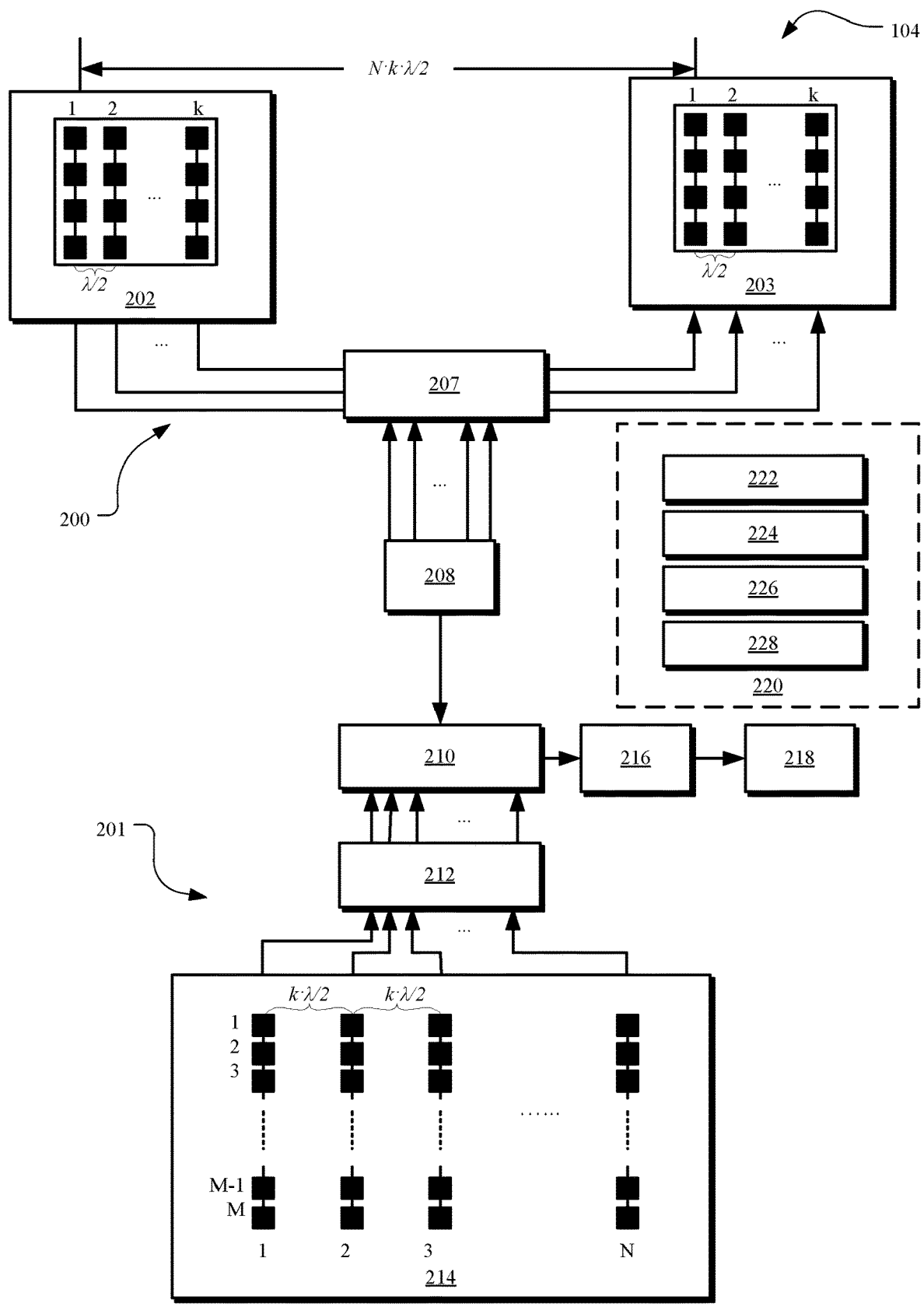
FIG. 4 shows a block diagram of another example radar antenna array system configured for multiple waveform simultaneous transmitting.

For a detailed description of examples of the radar antenna array system 104, reference is made to FIGS. 3 and 4. The radar antenna array system 104 includes distributed transmit antenna arrays and receive array antennas. As will be understood from FIGS. 3 and 4, the number of real channels implemented is reduced while maintaining the same benefit of implementing every channel. Stated differently, the benefit of having multiple channels to achieve a higher angular resolution is provided without including hardware for each of those channels, thereby driving down cost and complexity.

Turning first to FIG. 3, in one implementation, the radar antenna array system 104 includes a transmit antenna array system 200 in parallel orientation with a receive antenna array system 201 configured for single waveform sequential transmitting. The transmit antenna array system 200 includes one or more transmit antenna arrays, such as a first transmit antenna array 202 and a second transmit antenna array 203, each having k transmit antennas. In one implementation, the transmit antennas are each spaced a half wavelength (λ/2) apart from each other within the first transmit antenna array 202 and the second transmit antenna array 203. Similarly, the receive antenna array system includes one or more receive channels 1-N each having a sub-array with M elements, with the receive channels N spaced a half wavelength multiplied by the number of transmit antennas (k*λ/2) from each other. In other words, the receive antenna array system 201 is sparse and the transmit antenna arrays 202 and 203 are distributed. The first transmit antenna array 202 is spaced from the second transmit antenna array 203 by a distance of the number of receive channels multiplied by the number of transmit antennas and a half wavelength (N*k*λ/2). It will be appreciated that the transmit antenna array system 200 may include additional transmit antenna arrays at a distance of the receive antenna array system 201.

Each transmit antenna in the transmit antenna array system 200 covers desired azimuth and elevation spaces, and electronically steering and digitally processing the scattered energy received at the receive antenna array system 201 provides high resolution coverage of both azimuth and elevation space. To further improve accuracy and resolution, the receive antenna array system 201 is sparse and the transmit antenna array system 200 is distributed, which jointly form a larger virtual array without the cost of additional hardware. Each of the receive channels 1-N consist of a sub-array having M elements that can be electronically controlled to steer in elevation. The receive channels 1-N of the receive antenna array system 201 provide effective N elements corresponding to each transmitter antenna 1-k and overall there are N*2*k elements formed in the virtual array. Digital beam forming or other super resolution methods, including, but not limited to, MUSIC, ESPRIT, and/or the like, may be applied to the virtual receive array to provide high resolution in azimuth and cover the azimuth space simultaneously.

In one implementation, the radar antenna array system 104 includes a switch 204 in communication with the transmit antenna arrays 202 and 203 and a power amplifier 206. A waveform generator 208 is in communication with the power amplifier 206 and a receiver 210. A controller 220 includes a power manager 222, a timing controller 224, a communications manager 226, a logistics controller 228, and/or other devices or instructions for controlling the operation of the radar antenna array system 104.

In one implementation, the timing controller 224 initiates a waveform in the waveform generator 208, such as a phased locked loop with a voltage control oscillator (VCO), that will sweep over a frequency range (e.g., between approximately 76.5-77 GHz) over a time period (e.g., approximately 12.5 microseconds). The power amplifier 206 amplifies that acquired transmit power and the controller 220 sets up the switch 204 to transmit antenna 1 in the first transmit antenna array 202. In a single ramp/waveform sequence/sweep, the transmit antenna 1 illuminates the beam 106. The scattered energy from objects (e.g., the object 114) in the beam 106 propagates back to the receive antenna array system 201, incident on all N channels (e.g., 16 channels). Taking the object 114 in the beam 106 and given a relationship of the object 114 to the radar system 104, that backward propagating wavefront will create a planar wavefront, such that the phase crosses the receive elements in the receive antenna array system 201 in either increments or decreases based on the angle of arrival. Thus, if the object 114 is down boresight, then the wavefront will be normal to the direction of propagation, meaning that the phase difference across the entire receive antenna array system 201 is zero. Boresight represents zero degrees in azimuth and elevation or in other words an axis that is normal to a center of the radar antenna array system 104. When transmitting, the transmit antenna has wide field of view, with each transmitter antenna covering approximately 100 degrees in azimuth and 60 degrees in elevation and in each receive antenna. Thus, the summation of radar antenna array system 104 as a whole creates a narrow beam width (e.g., approximately 0.8 degrees).

The radar antenna array system 104 may further include receive beam forming networks 212. If the receive beam forming networks 212 are not included such that there is no beam forming up front, the receiver 210 takes the scattered energy at each receive element antenna (e.g., 77 GHz) and down coverts it to an intermediate frequency (IF) and passes that to a signal data processor 216. In the signal data processor 216, beam forming is performed along the azimuth plane by taking a transform across the elements. Where the receive beam forming networks 212 are included in the radar antenna array system 104, beam forming is performed prior to sending to the signal data processor 216, where a single signal is translated into range information by taking a transform, such as a fast Fourier transform. An environmental tracker 218 collects, stores, and analyzes the data. This process is repeated for a plurality of ramps/times (e.g., 256) for the transmit antenna 1. Once that is completed, the controller 220 commands the switch 204 to transmit from transmit antenna 2 in the first transmit antenna array 202. For transmit antenna 2, the radar antenna array system 104 sweeps the same number of times (e.g., 256) and collects the environmental scatter and does the same digital signal processing each time. The transmit waveform in transmit antenna 2 is the same in a time domain duplex system as transmit antenna 1. However, because transmit antenna 2 is spaced a half wavelength away, it gives the radar antenna array system 104 a new perspective on the scene. Stated differently, transmitting from the transmit antenna 2 after transmit antenna 1 changes the phase relationship of the entire system by a half wavelength. The process will continue for each of the k transmit antennas.

Figure 7:
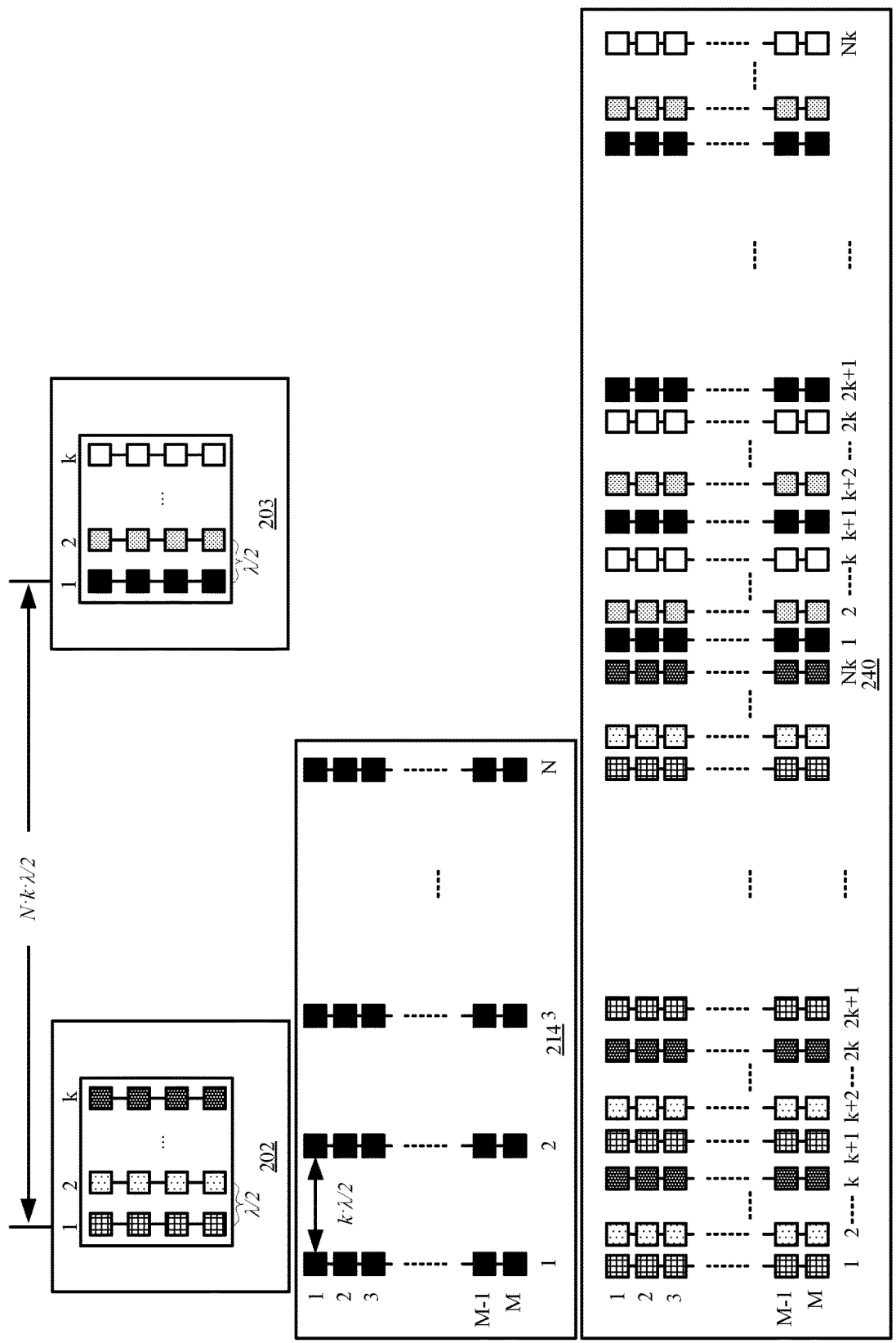
FIG. 7 shows an example virtual array formed using the radar antenna array system of FIG. 3 or 4.

Referring to FIG. 3 and FIG. 7, in one implementation, when the radar antenna array system 104 completes transmission and processing for each of the k transmit antennas in the first transmit antenna array 202, if k is 4 for example, then the virtual receive array 240 is essentially filled in: the receive channels N are spaced at k*λ/2 so if k is 4 then the antenna spacing in the receiver antenna system 201 are two wavelengths. Thus, the radar antenna array system 104 convolved the first transmit array 202 with the receive array system 201, such that it is contiguous across the entire virtual array 240. The second transmit antenna array 203 is spaced at N*k*λ/2, so it will double the virtual array 420 size. For example, transmitting from the first transmit array 202 will form each of the elements in the first set of columns 1-Nk (shown on the left of the virtual array 240 shaded in patterns) of the virtual array 420 for one elevation orientation for single beam forming networks, and transmitting from the second transmit array 203 will form each of the elements in the second set of columns 1-Nk (shown on the right of the virtual array 240 in grayscale) of the virtual array 240. As such, the radar antenna array system 104 synthesizes the virtual array 240 for the elevation orientation from an incidence of the target scatter on each of receive channels for each of the transmit antennas, such that the virtual array 240 has a size corresponding to the first transmit antenna array 202 convolved with the receive array system 201.

After completing for one elevation orientation, the beam 106 may be pointed at another elevation orientation angle. In one implementation, the real aperture radar beam 106 is a fan, and the fan is laid parallel to the group and moved up and down in elevation. The signal data processor 216 may perform MIMO digital beam forming, taking that fan and narrowing it down to a narrow beam width in azimuth. In one implementation, the elevation angle is controlled on the receiving side of the radar antenna array system 104. However, it will be appreciated that the elevation angle may be controlled on the receiving side, the transmitting side, or both. Controlling the elevation angle through elevation beam forming on the receiving side allows for interference mitigation and otherwise simplifies the system.

For each elevation orientation, the radar antenna array system 104 transmits from each of the transmit antennas sequentially and stitches together the virtual array 240 based on the individual firings of each transmit antenna. The signal data processor 216 gathers all the information then take the Fourier transform across the virtual array 240 in every range. Thus, for every detection and range, the radar antenna array system 104 generates an angular determination in azimuth because the Fourier transform is across the entire virtual array 240 which is in azimuth. This will uncover that there are multiple objects in certain range gait depending on the phenomenology. As such, the same core dataset is acquired and then processed using fast fourier transforms to perform azimuth beam forming (treating as simultaneously sweeping the azimuths).

Stated differently, the radar antenna array system 104 collects all the information and clocks to the signal data processor 216, which generates the environmental model using the tracker 218 based on the current elevation beam position. Once that is completed, the radar antenna array system 104 steps the elevation up one increment to another elevation orientation (e.g., moving the fan up certain number of degrees from the orientation 118 to the orientation 120) and then repeating the process again. In the new elevation orientation, the radar antenna array system 104 completes an entire transmit antenna array sequence 1-k on array 202 and then 1-k on 203 to give an entire measurement sequence for that elevation beam orientation. Then the radar antenna array system 104 either uses receive array beam forming to focus the beam up or down or in the transmit array to focus up or down to another elevation orientation, where the process is completed again. To shift the elevation between orientations, a phase shift or time delay may be used on the transmit and/or receive side. Through the process multiple beams are collected in azimuth simultaneously.

The example of the radar antenna array system 104 illustrated in FIG. 3 utilizes time-multiplexing waveforms, which means that the same radar waveforms are transmitted sequentially through each of the transmit antennas. This reduces the cost of transmitter design through a simple switching network and avoids the complexities in receiver design in that a single matched filter demodulates the only transmitted waveforms. In this example, the virtual array is formed after all the transmitter antennas complete transmission.

To reduce the overall dwell time and increase update rate, in another implementation, shown in FIG. 4, the radar antenna array system 104 is configured for multiple waveform simultaneous transmitting. In the example illustrated in FIG. 4, the radar antenna array system 104 simultaneously transmits waveforms through multiple transmit antennas. The waveforms transmitted by each of the simultaneously transmitting antennas are orthogonal to each other. Upon receive, each of the receiver channels separate the transmitted waveforms using multiple matched filters corresponding to the transmitted waveforms. The orthogonality may be achieved through frequency-multiplexing or phase-multiplexing, such as pseudo-random binary sequences. M-sequences, Frank codes, or any other orthogonal phase codes. The implementation shown in FIG. 4 thus increases the hardware complexity in that each of the receive channels separates all transmitted waveforms corresponding to the transmit antennas. Further, some of the phase coding utilizes a higher sampling rate.

The example implementation shown in FIG. 4 is thus similar to the example implementation shown in FIG. 3, but instead of using time multiplexing, a power amplifier distribution network 207 is included to transmit simultaneously from all the transmit antennas, with each antenna having a unique waveform orthogonal to each other. The receiver 210 separates those waveforms from each other. Thus, instead of waiting for the transmitter antennas to complete transmission one by one, they can all transmit at the same time with receiver 210 configured to distinguish the various waveforms.

Figure 5:
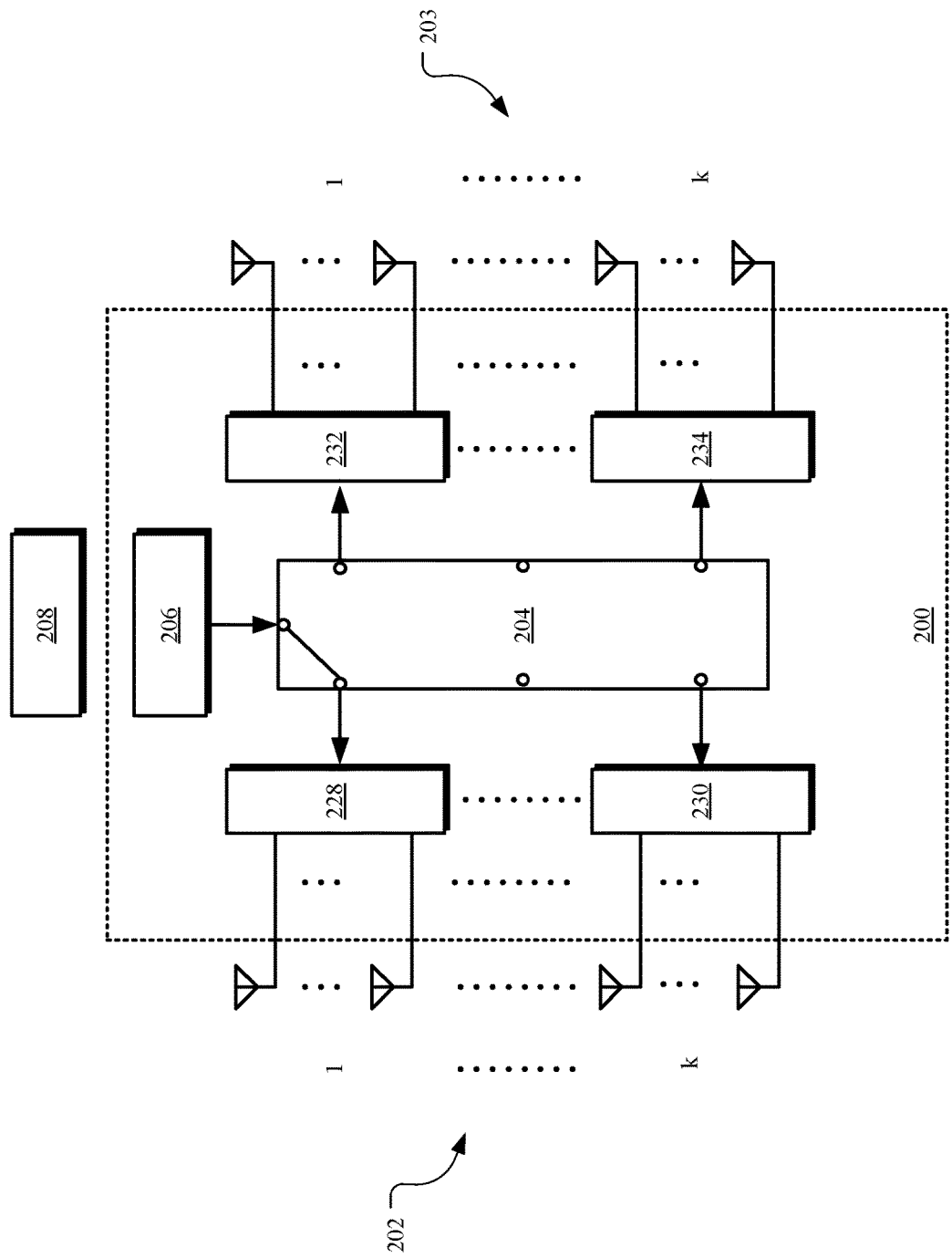
FIG. 5 illustrates an example transmit array system having two transmit arrays each containing k antennas.

Turning to FIG. 5, an example transmit array system 200 having two transmit arrays 202 and 203 each containing k antennas is shown. In one implementation, the waveform generator 208 generates a waveform (e.g., FMTW). The waveform is amplified with the power amplifier 206 and sent through the switch network 204, which will select which antenna to transmit the signal through. For example, there may be 8 transmit antennas divided into groups, as shown in the example of FIG. 3. Whichever antenna the switch 204 connects the waveform generator 208 to will be the antenna that transmits that waveform. In the example shown in FIG. 5, each transmit antenna 1-k shown is a sub-array. In one implementation, there is an elevation beam forming network provided on the transmit side, with a phase shifter control included in power distributers 228-234. In another implementation, elevation beam forming is controlled on the receive side, as discussed herein.

Figure 6:
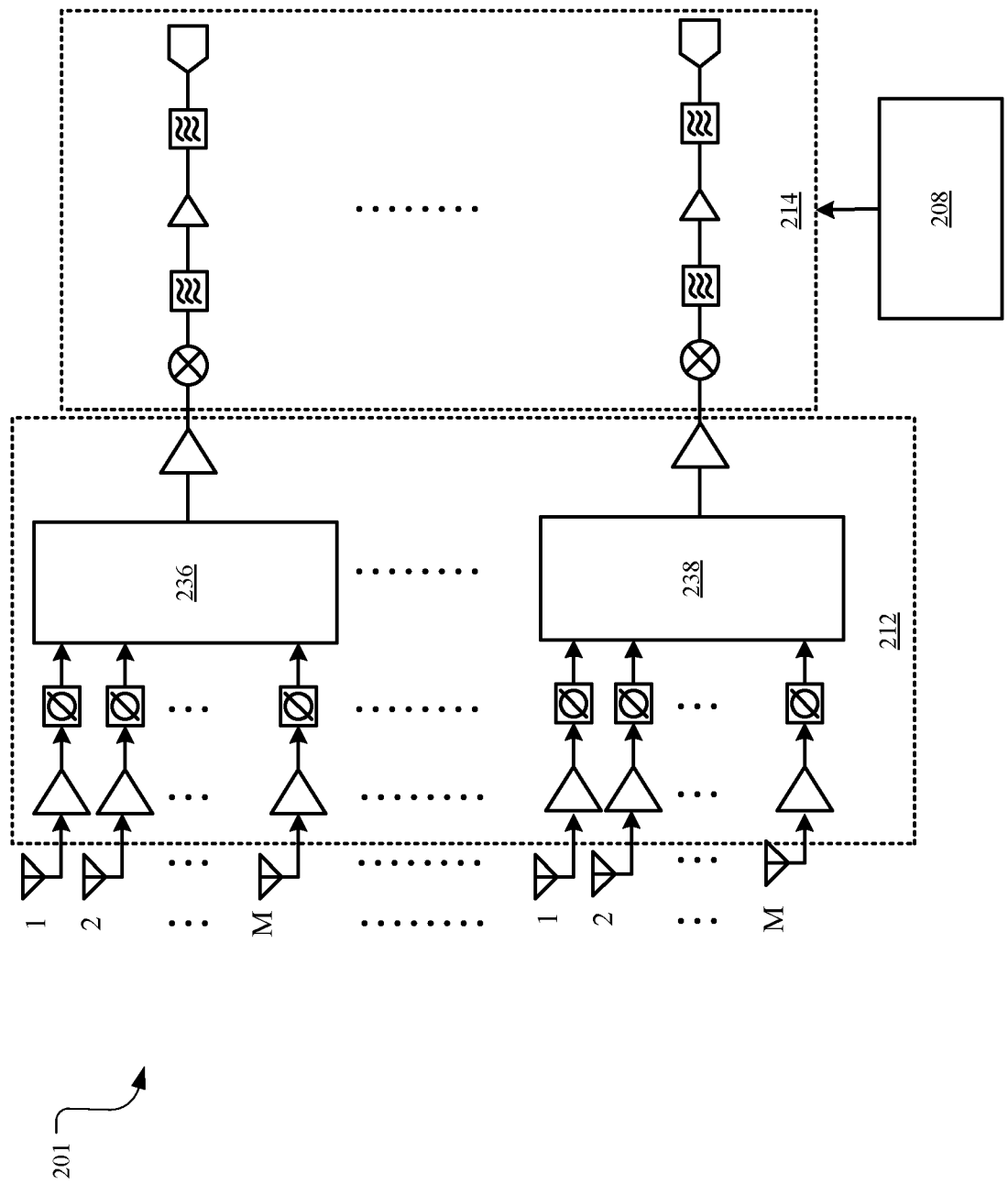
FIG. 6 depicts an example receive array system with N channels.

Referring to FIG. 6, an example receive array system 201 may include N channels, with each channel having an M element sub-array. Sub-array combiner networks 236 and 238 may be used for elevation beam forming. More particularly, in one implementation, by controlling the combiner networks 236 and 238 with a phase shifter to the left side to beam form the receive array, the beam 106 may be pointed to different elevation angles to collect data and then process the virtual array 240 to get the azimuth coverage for the beams 106.

Figure 8:
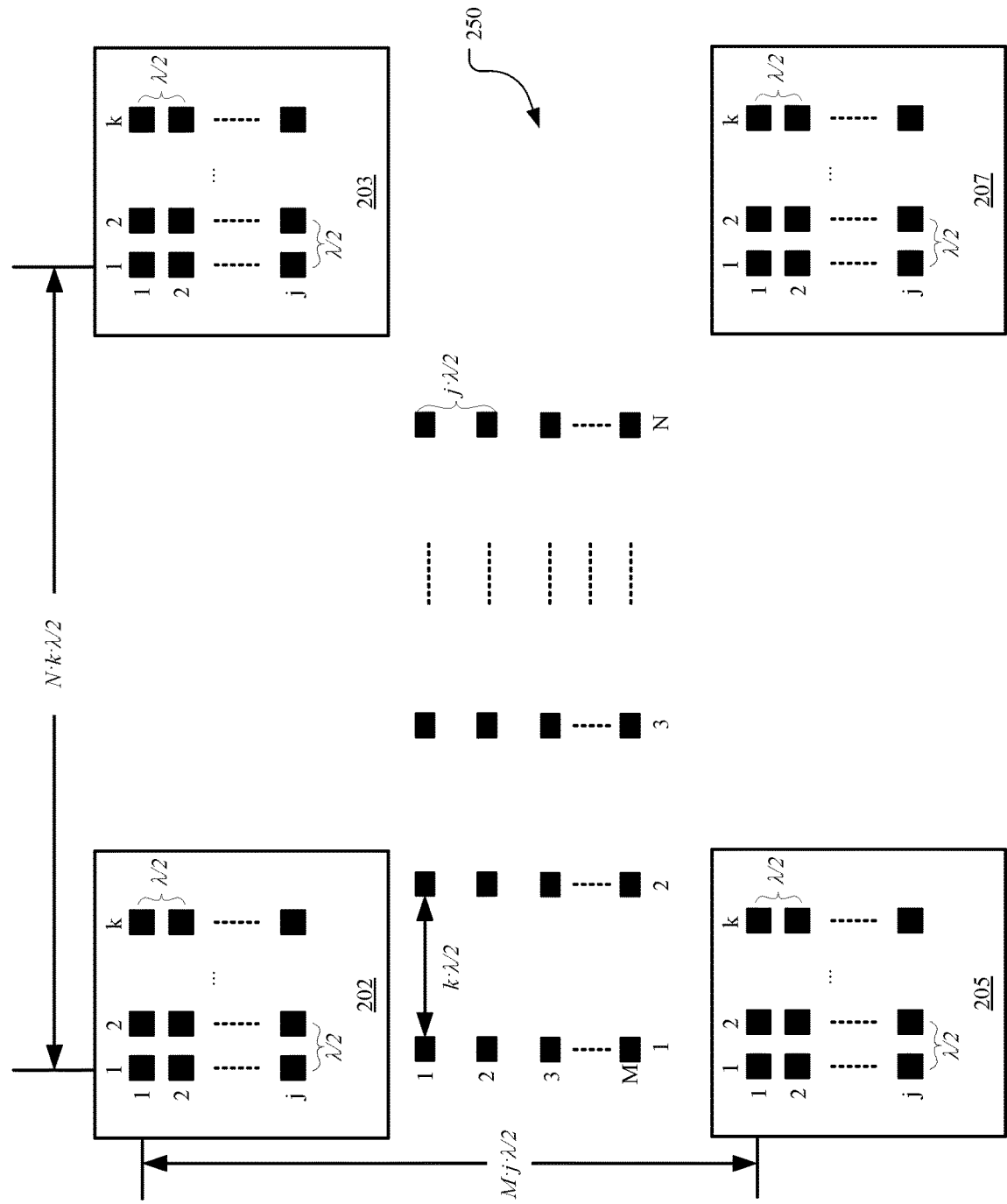
FIG. 8 illustrates an example planar virtual array.

As discussed above, in one implementation, the radar antenna array system 104 of FIG. 3 or 4 synthesizes a virtual array 240 as a linear array for each elevation orientation. In another implementation shown in FIG. 8, a planar virtual array 250 may be generated. The radar antenna array system 104 extends the linear array into the elevation domain. In one implementation, the radar antenna array system 104 gathers the phase shifter of the beam forming scanning in elevation, now done in both dimensions. Stated differently, the radar antenna array system 104 replaces the elevation scanning in different elevation orientations with something similar to azimuth beam forming described above for elevation as well. In the example of FIG. 8, there is no sub-array. Instead, each element is a single antenna that either fire all the time with different wave forms or one by one going through the matrix for each array. Then use the same technique described above is performed in both azimuth and elevation dimensions, providing the planar virtual array 250.

Figure 9:
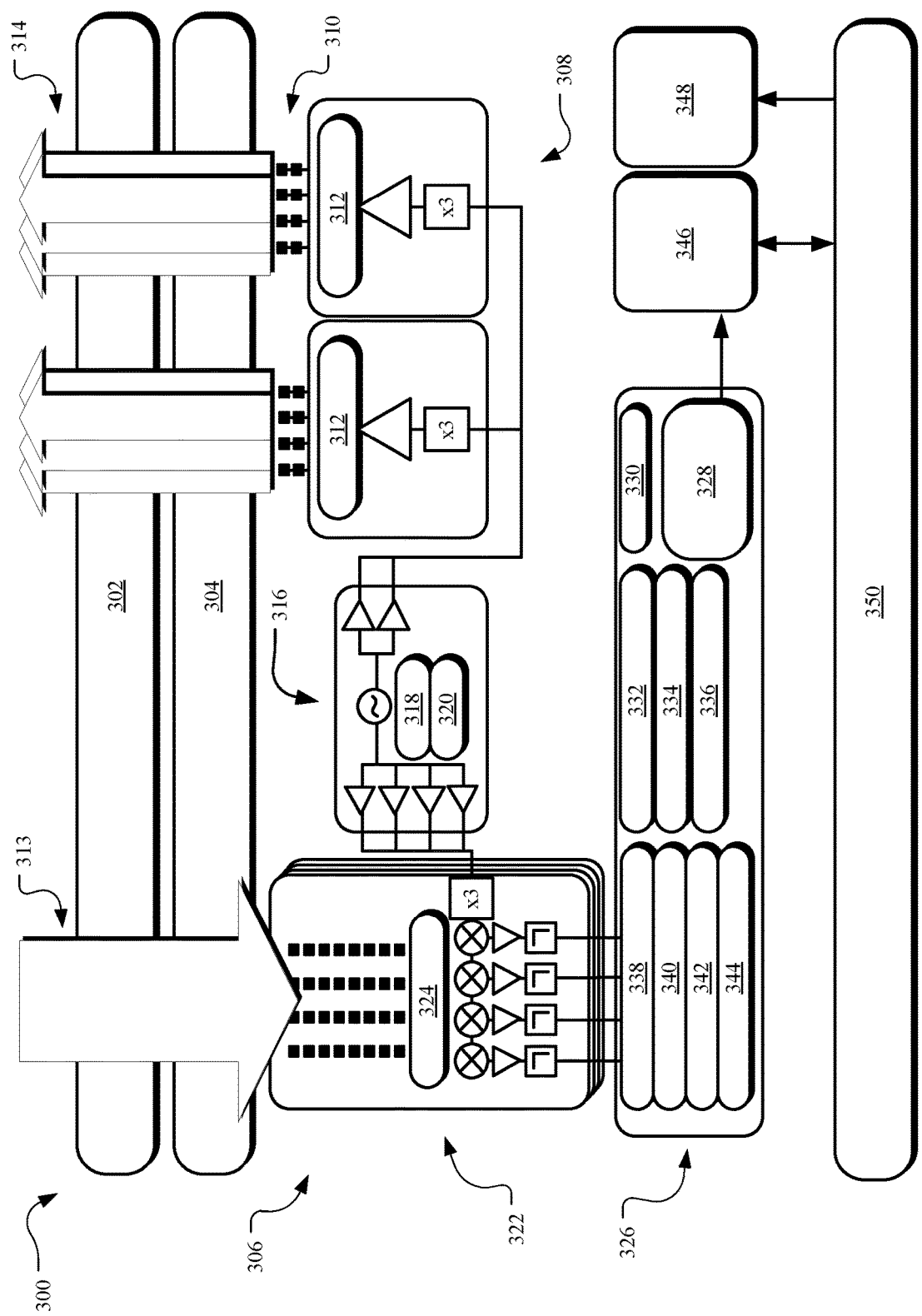
FIG. 9 depicts a diagram of an example detection system having a radar antenna array system.

FIG. 9 depicts a diagram of an example detection system 300 having a radar antenna array system. In one implementation, the detection system 300 includes: a fascia 302 of the vehicle 102 (e.g., made from a non-metalic material); a radome 304 covering the radar antenna array system 104 (e.g., made from plastic); an RF board 306; a digital signal processing (DSP) board 326; and an interface 350.

In one implementation, printed transmit antennas 310 are in communication with multiplexers 312 to generated transmit beams 314 (e.g., the beam 106) through the fascia 302 along the travel path of the vehicle 102. The multiplexers 312 and transmit antennas 310 may be substantially similar to the transmit antenna array system 200. The multiplexers 312 are in communication with a controller 316 having a power amplifier 318 and waveform generator 320, which may be substantially similar to the waveform generator 208 and controller 220. The timing controller 316 is also in communication with an electronically steerable receive array 322 having a beam forming network 324 configured to receive and process target scatter 313 substantially similar to the receiver array 201. The DSP board 326, in one implementation, includes a timing controller 330, a processing controller 328, a compressor 332, a maintenance controller 334, a BIST controller 336, a digital receive signal processor 338 (e.g., 16× ADCs 150 Msps), a 4D data formation controller 340 configured to save the processed data, a detections controller 342, and an interpolation controller 344. In one implementation, the processing controller 328 is in communication with a NIC 346 to connect to the interface 350 (e.g., via Ethernet) and a power regulator 348 connected to a power source of the interface 350.

Figure 10:
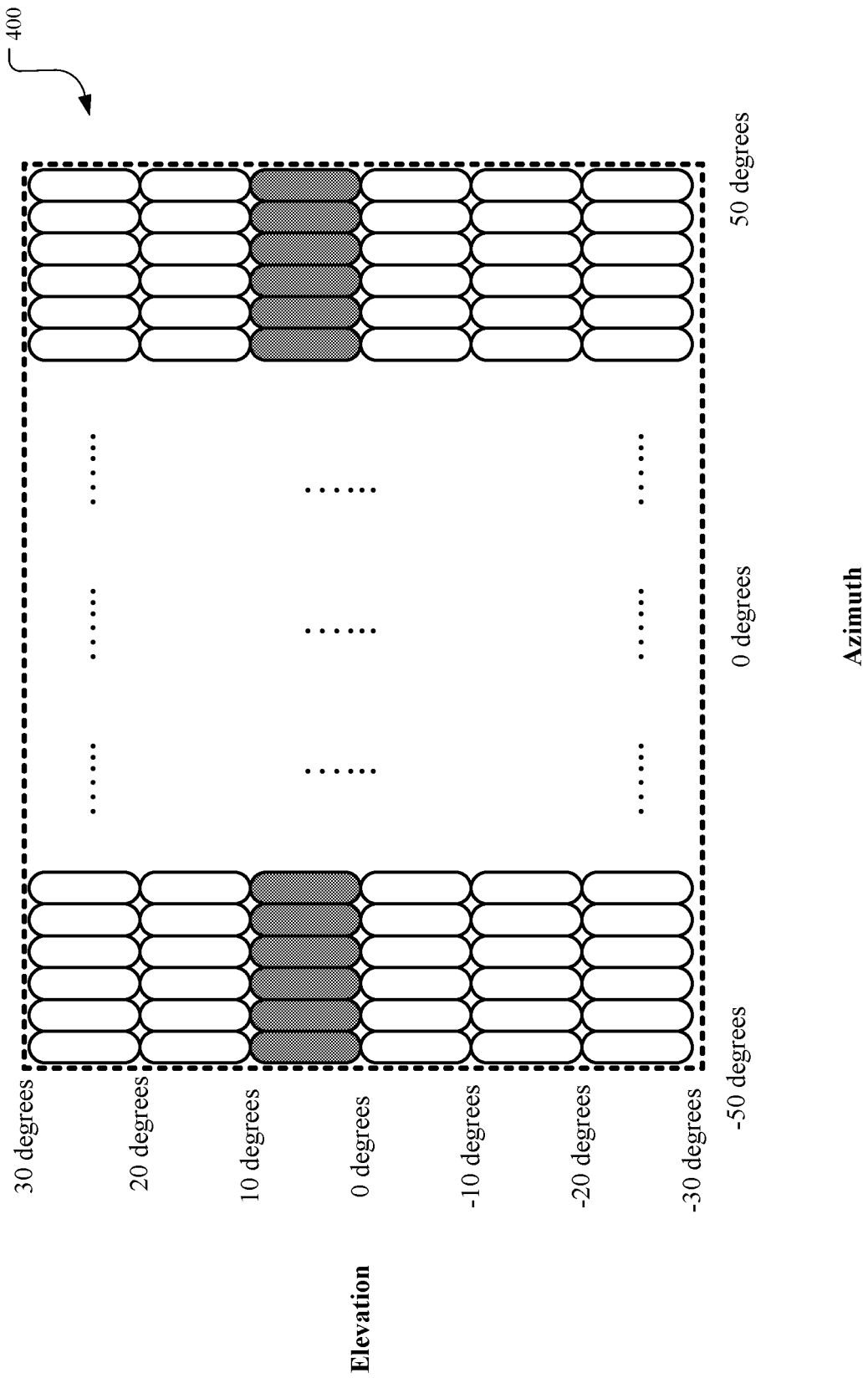
FIG. 10 shows example coverage patterns of the radar antenna array system.

FIG. 10 shows example coverage patterns 400 of the radar antenna array system 104. In one implementation, the transmit antenna coverage includes the dotted zone of 100 degrees in azimuth and 60 degrees in elevation, and the receive virtual array resolution at boresight is 0.8 degrees in azimuth and 10 degrees in elevation. The coverage patterns 400 correspond to an exemplary design with 8 transmitter antennas and 16 receive channels. The dotted box of 100° (azimuth)×60° (elevation) indicates the footprint of each antenna in the transmit antenna array. In this example, each of the 8 transmitter antennas covers the whole space of interest. Each channel of the receive array is electronically steered by either phase shifter or time delay at each sub-array antenna element at each scan step in elevation. For one particular scan step as indicated by the shaded blocks, the receive sub-array antenna elements associated with each channel electronically focus their receive beam into 0 to 10 degrees in elevation and −50 to 50 degrees in azimuth. One of the transit antennas illuminates the space of interest for a predefined dwell time and after data collection, data from all 16 receive array channels are digitally processed and stored. This process repeats for every one of the 8 transmitter antennas and at the end of the process there is a 8*16 virtual array formed. The order of the transmitting antenna may vary. By performing beam forming on the 128 virtual element array, this design provides a 0.8° beam width in azimuth at boresight with multiple digital beams generated simultaneously to cover the −50° to 50° azimuth space. Note the footprint in FIG. 9 is just for explanation purpose and not intended to be limiting. In practice the footprint may grow bigger towards the boundary of the coverage space following cosine laws.

FIG. 10 thus shows the coverage patterns 400 with radar image stitched together with the range and Doppler information not shown. Looking through the eyes of the radar system 104, the azimuth plane has +/−50° and the elevation has +/−30° coverage, which is the field of view in azimuth and elevation. These are angular resolutions and represent a culmination of all the transmit antennas having fired sequentially and all the data collected and processed. Once azimuth beam forming in digital signal processing domain is completed, then the shaded row is obtained as receive array footprints (i.e., one measurement in the elevation beam), then the system 104 steps up to the next elevation orientation to operate in the 10-20° elevation tick. Signal processing gives azimuth data.

Figure 11:
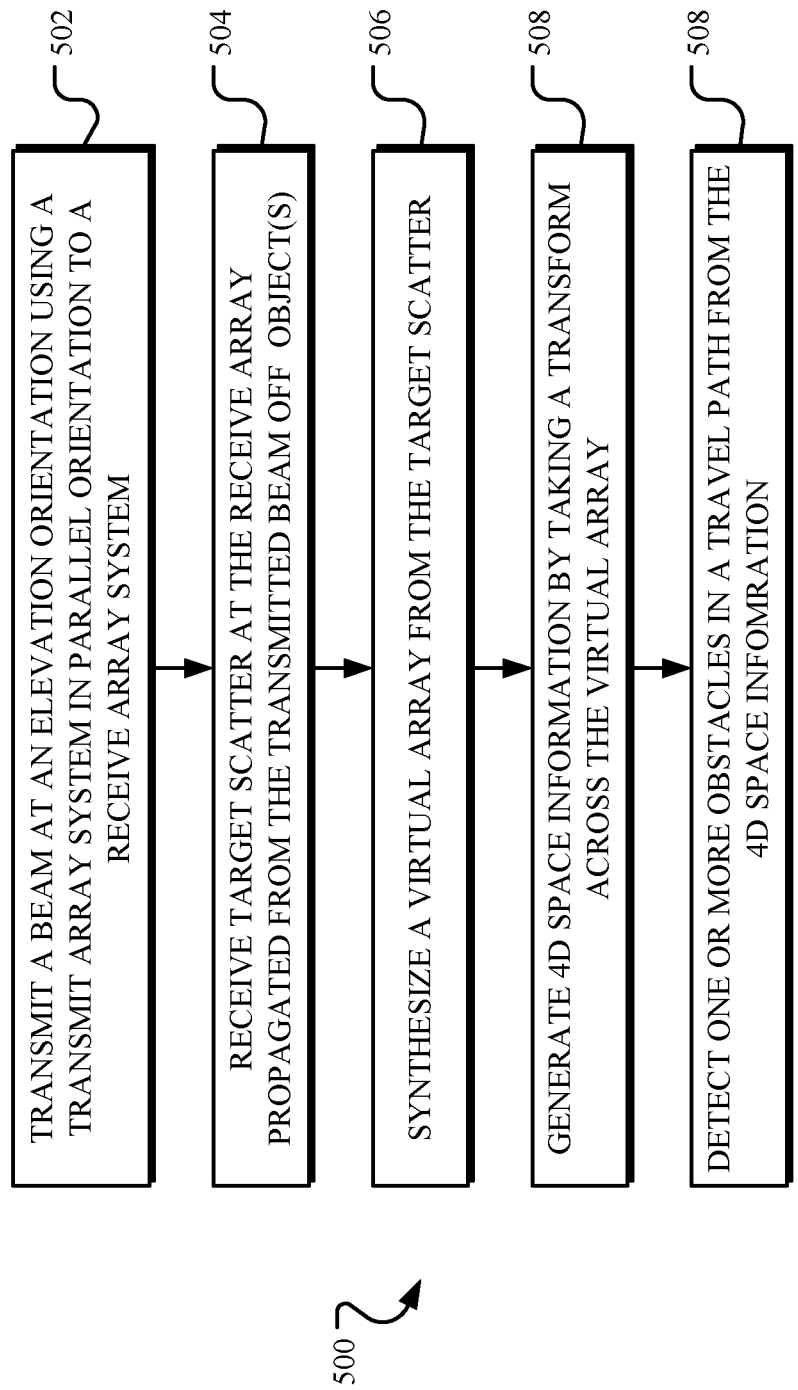
FIG. 11 illustrates example operations for detecting an obstacle using a radar antenna array system.

FIG. 11 illustrates example operations 500 for detecting an obstacle using a radar antenna array system. In one implementation, an operation 502 transmits a beam at an elevation orientation using a transmit array system in parallel orientation to a receive array system. The transmit array system has one or more transmit antenna arrays, each having k transmit antennas. The transmit antennas are each spaced a half wavelength ($\lambda/2$) apart from each other within each of the transmit antenna arrays. Similarly, the receive antenna array system includes one or more receive channels 1-N each having a sub-array with M elements, with the receive channels N spaced a half wavelength multiplied by the number of transmit antennas ($k*\lambda/2$) from each other. The transmit antenna arrays are spaced from each other by a distance of the number of receive channels multiplied by the number of transmit antennas and a half wavelength ($N*k*\lambda/2$). An operation 504 receives target scatter at the receive array propagated from the transmitted beam off one or more objects. An operation 506 synthesizes a virtual array from the target scatter based on the configuration of the transmit array and the receive array. An operation 508 generates four dimensional (4D) space information by taking a transform across the virtual array, and an operation 510 detects one or more obstacles in a travel path for a vehicle from the 4D space information.

Figure 12:
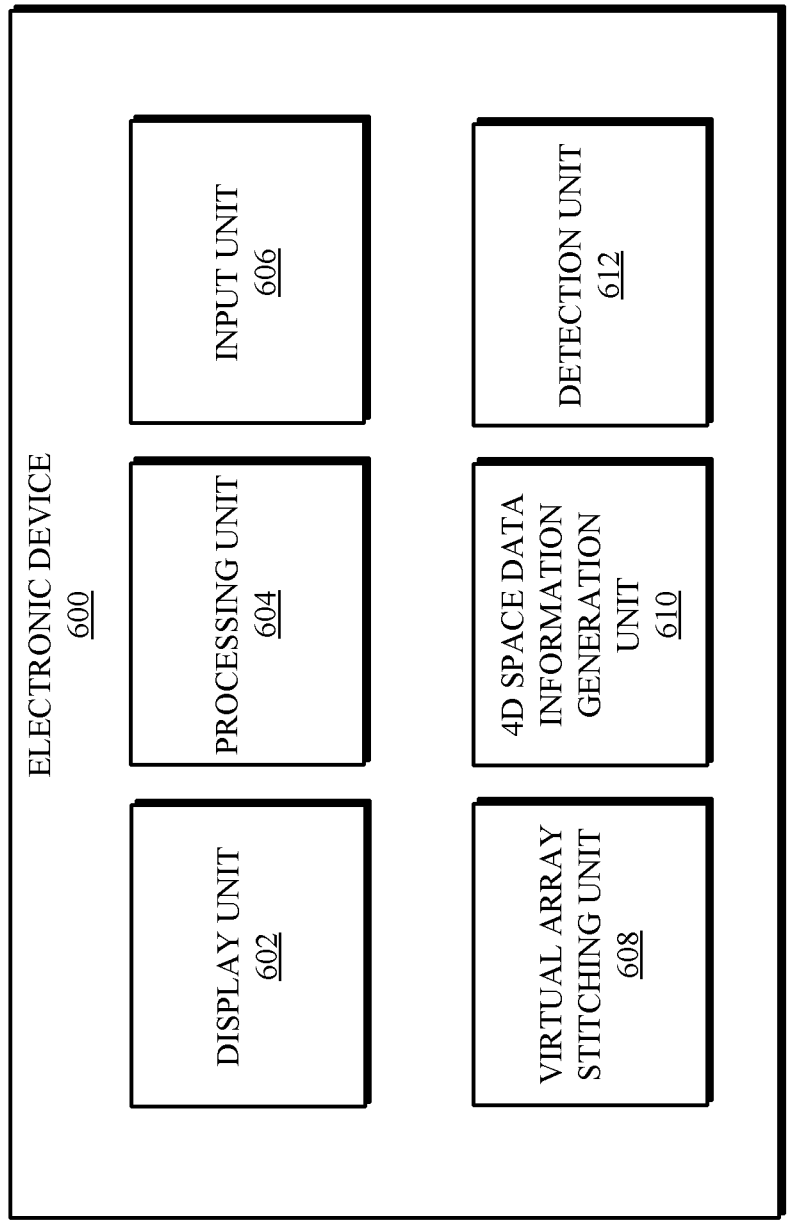
FIG. 12 is a functional block diagram of an electronic device including operational units arranged to perform various operations of the presently disclosed technology.

Turning to FIG. 12, an electronic device 600 including operational units 602-612 arranged to perform various operations of the presently disclosed technology is shown. The operational units 602-612 of the device 600 are implemented by hardware or a combination of hardware and software to carry out the principles of the present disclosure. It will be understood by persons of skill in the art that the operational units 602-612 described in FIG. 12 may be combined or separated into sub-blocks to implement the principles of the present disclosure. Therefore, the description herein supports any possible combination or separation or further definition of the operational units 602-612.

In one implementation, the electronic device 600 includes a display unit 602 to display information, such as a graphical user interface with obstacle detection information, and a processing unit 604 in communication with the display unit 602 and an input unit 606 to receive data from one or more input devices or systems, such as the radar system 104. Various operations described herein may be implemented by the processing unit 604 using data received by the input unit 606 to output information for display using the display unit 602.

Additionally, in one implementation, the electronic device 600 includes synthesizing unit 608, a 4D space data information generation unit 610, and a detection unit 612. The synthesizing unit 608 synthesizes the virtual array. The 4D space data information generation unit 610 generates the 4D space data information from the virtual array, and the detection unit 612 detects one or more obstacles in the vehicle travel path. In another implementation, the electronic device 600 includes units implementing the operations described with respect to FIG. 11.

Figure 13:
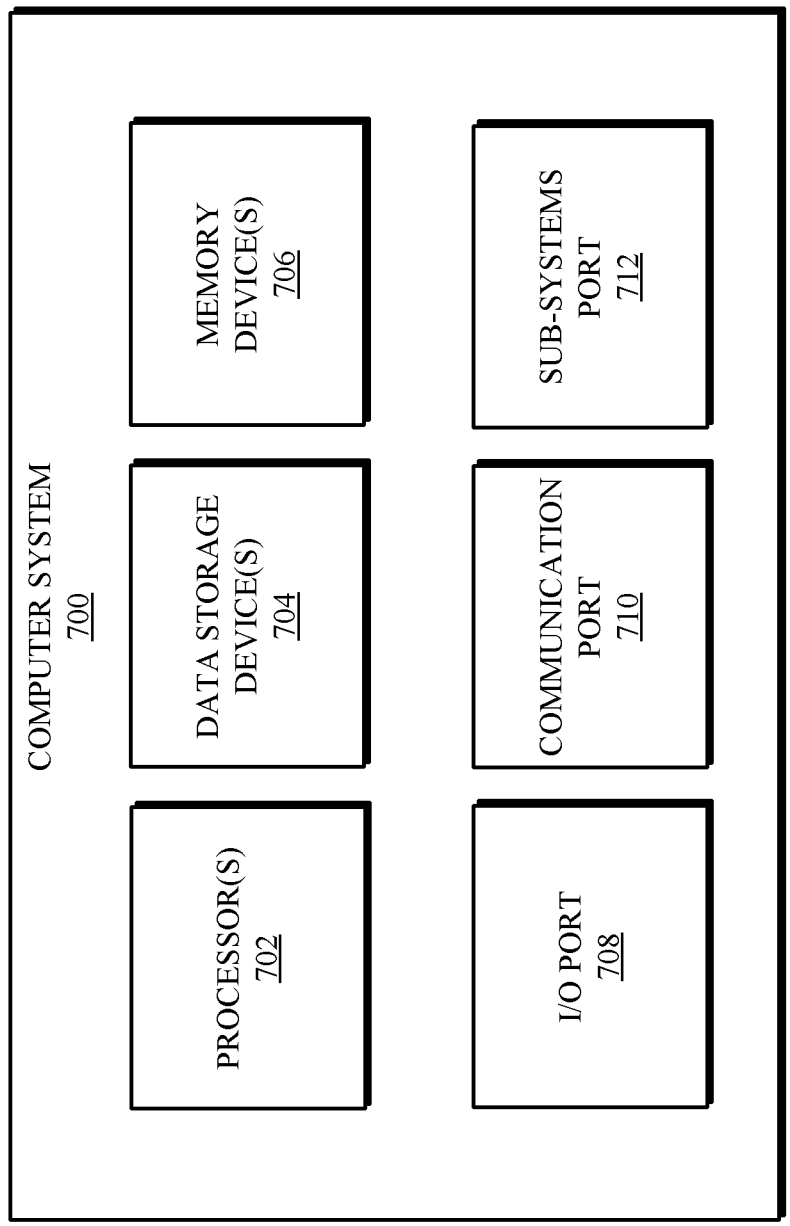
FIG. 13 is an example computing system that may implement various systems and methods of the presently disclosed technology.

Referring to FIG. 13, a detailed description of an example computing system 700 having one or more computing units that may implement various systems and methods discussed herein is provided. The computing system 700 may be applicable to features of the radar system 104, such as the controller 220, the DSP 306, and other computing or network devices. It will be appreciated that specific implementations of these devices may be of differing possible specific computing architectures not all of which are specifically discussed herein but will be understood by those of ordinary skill in the art.

The computer system 700 may be a computing system is capable of executing a computer program product to execute a computer process. Data and program files may be input to the computer system 700, which reads the files and executes the programs therein. Some of the elements of the computer system 700 are shown in FIG. 13, including one or more hardware processors 702, one or more data storage devices 704, one or more memory devices 708, and/or one or more ports 708-712. Additionally, other elements that will be recognized by those skilled in the art may be included in the computing system 700 but are not explicitly depicted in FIG. 13 or discussed further herein. Various elements of the computer system 700 may communicate with one another by way of one or more communication buses, point-to-point communication paths, or other communication means not explicitly depicted in FIG. 13.

The processor 702 may include, for example, a central processing unit (CPU), a microprocessor, a microcontroller, a digital signal processor (DSP), and/or one or more internal levels of cache. There may be one or more processors 702, such that the processor 702 comprises a single central-processing unit, or a plurality of processing units capable of executing instructions and performing operations in parallel with each other, commonly referred to as a parallel processing environment.

The computer system 700 may be a conventional computer, a distributed computer, or any other type of computer, such as one or more external computers made available via a cloud computing architecture. The presently described technology is optionally implemented in software stored on the data stored device(s) 704, stored on the memory device (s) 706, and/or communicated via one or more of the ports 708-712, thereby transforming the computer system 700 in FIG. 13 to a special purpose machine for implementing the operations described herein. Examples of the computer system 700 include personal computers, terminals, workstations, mobile phones, tablets, laptops, personal computers, multimedia consoles, gaming consoles, set top boxes, and the like.

The one or more data storage devices 704 may include any non-volatile data storage device capable of storing data generated or employed within the computing system 700, such as computer executable instructions for performing a computer process, which may include instructions of both application programs and an operating system (OS) that manages the various components of the computing system 700. The data storage devices 704 may include, without limitation, magnetic disk drives, optical disk drives, solid state drives (SSDs), flash drives, and the like. The data storage devices 704 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 706 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 704 and/or the memory devices 706, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 700 includes one or more ports, such as an input/output (I/O) port 708, a communication port 710, and a sub-systems port 712, for communicating with other computing, network, or vehicle devices. It will be appreciated that the ports 708-712 may be combined or separate and that more or fewer ports may be included in the computer system 700.

The I/O port 708 may be connected to an I/O device, or other device, by which information is input to or output from the computing system 700. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 700 via the I/O port 708. Similarly, the output devices may convert electrical signals received from computing system 700 via the I/O port 708 into signals that may be sensed as output by a human, such as sound, light, and/or touch. The input device may be an alphanumeric input device, including alphanumeric and other keys for communicating information and/or command selections to the processor 702 via the I/O port 708. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 700 via the I/O port 708. For example, an electrical signal generated within the computing system 700 may be converted to another type of signal, and/or vice-versa. In one implementation, the environment transducer devices sense characteristics or aspects of an environment local to or remote from the computing device 700, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 700, such as, physical movement of some object (e.g., a mechanical actuator), heating or cooling of a substance, adding a chemical substance, and/or the like.

In one implementation, a communication port 710 is connected to a network by way of which the computer system 700 may receive network data useful in executing the methods and systems set out herein as well as transmitting information and network configuration changes determined thereby. Stated differently, the communication port 710 connects the computer system 700 to one or more communication interface devices configured to transmit and/or receive information between the computing system 700 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 710 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 710 may communicate with an antenna or other link for electromagnetic signal transmission and/or reception. In some examples, an antenna may be employed to receive Global Positioning System (GPS) data to facilitate determination of a location of a machine, vehicle, or another device.

The computer system 700 may include a sub-systems port 712 for communicating with one or more systems related to the vehicle 102 to control an operation of the vehicle 102 and/or exchange information between the computer system 700 and one or more sub-systems of the vehicle. Examples of such sub-systems of a vehicle, include, without limitation, imaging systems, radar, lidar, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

In an example implementation, 4D space information, obstacle detection information, and software and other modules and services may be embodied by instructions stored on the data storage devices 704 and/or the memory devices 706 and executed by the processor 702. The computer system 700 may be integrated with or otherwise form part of a vehicle. In some instances, the computer system 700 is a portable device that may be in communication and working in conjunction with various systems or sub-systems of a vehicle.

The present disclosure recognizes that the use of such information may be used to the benefit of users. For example, the location information of a vehicle may be used to provide targeted information concerning a "best" path or route to the vehicle and to avoid surface hazards. Accordingly, use of such information enables calculated control of an autonomous vehicle. Further, other uses for location information that benefit a user of the vehicle are also contemplated by the present disclosure.

Users can selectively block use of, or access to, personal data, such as location information. A system incorporating some or all of the technologies described herein can include hardware and/or software that prevents or blocks access to such personal data. For example, the system can allow users to "opt in" or "opt out" of participation in the collection of personal data or portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses and not share or sell the data outside of those legitimate uses. Such collection should occur only after receiving the users' informed consent. Furthermore, third parties can evaluate these entities to certify their adherence to established privacy policies and practices.

The system set forth in FIG. 13 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for obstacle detection, the method comprising:
    transmitting a beam at an elevation orientation along a travel path from a transmit array system, the transmit array system including a transmit antenna array having one or more transmit antennas;
    receiving target scatter at a receive array system, the target scatter propagated from the beam off one or more objects in an environment associated with the travel path, the receive array system in a parallel orientation with the transmit array system and including one or more receive channels each having a sub-array with at least one element;
    synthesizing a virtual array for the elevation orientation from an incidence of the target scatter on each of the one or more receive channels for each of the one or more transmit antennas, the virtual array having a size corresponding to the transmit antenna array convolved with the receive array system;
    generating four dimensional space information for the environment by taking a transform across the virtual array, the four dimensional space information including one or more of range coverage, azimuth coverage, elevation coverage, and Doppler coverage; and
    detecting any obstacles along the travel path in the one or more objects from the four dimensional space information.

2. The method of claim 1, wherein the transmit array system includes a second transmit antenna array, the size of the virtual array corresponding to the transmit antenna array convolved with the receive array system contiguous with the second transmit antenna array convolved with the receive array system.

3. The method of claim 1, wherein the transmit array system includes a second transmit antenna array, doubling the size of the virtual array.

4. The method of claim 1, wherein the elevation orientation is one of a plurality of elevation orientations, a corresponding virtual array being synthesized for each of the plurality of elevation orientations.

5. The method of claim 1, wherein the beam is transmitted through single waveform sequential transmitting from the one or more transmitter antennas.

6. The method of claim 1, wherein the beam is transmitted through multiple waveform simultaneous transmitting from the one or more transmitter antennas.

7. The method of claim 1, wherein the receive array system is sparse and the transmitter antenna array is distributed.

8. The method of claim 1, wherein the one or more transmit antennas are spaced a half wavelength apart from each other.

9. The method of claim 1, wherein the transmit antenna array is spaced from a second transmit antenna array by a distance of the number of the one or more receive channels multiplied by a number of the one or more transmit antennas and a half wavelength.

10. The method of claim 1, wherein the one or more receive channels are spaced a half wavelength multiplied by a number of the one or more transmit antennas from each other.

11. The method of claim 1, wherein the transform is a fast Fourier transform.

12. The method of claim 1, wherein each of the one or more receive channels is electronically steerable.

13. A method for obstacle detection, the method comprising:
    transmitting a beam at a first elevation orientation of a plurality of elevation orientations along a travel path from a transmit array system, the transmit array system including one or more transmit antenna arrays each having one or more transmit antennas;
    receiving target scatter at a receive array system, the target scatter propagated from the beam off one or more objects in an environment associated with the travel path, the receive array system including one or more receive channels;
    synthesizing a virtual array for the first elevation orientation from an incidence of the target scatter on each of the one or more receive channels for each of the one or more transmit antennas, the virtual array having a size corresponding to the one or more transmit antenna arrays convolved with the receive array system;
    generating four dimensional space information for the environment from the virtual array, the four dimensional space information including one or more of range coverage, azimuth coverage, elevation coverage, and Doppler coverage; and
    detecting any obstacles along the travel path in the one or more objects from the four dimensional space information.

14. The method of claim 13, wherein the virtual array is linear or planar.

15. A system for obstacle detection, the system comprising:
    a transmit array system including one or more transmit antenna arrays, each of the one or more transmit arrays having one or more transmit antennas configured to transmit a beam at a first elevation orientation of a plurality of elevation orientations along a travel path; and
    a receive array system including one or more receive channels, the receive array system synthesizing a virtual array for the first elevation orientation from an incidence of target scatter on each of the one or more receive channels for each of the one or more transmit antennas, the target scatter propagated from the beam off one or more objects in an environment associated with the travel path, the virtual array having a size corresponding to the one or more transmit antenna arrays convolved with the receive array system.

16. The system of claim 15, further comprising:
    an environmental tracker generating four dimensional space information for the environment from the virtual array, the four dimensional space information used to detect any obstacles along the travel path in the one or more objects, the four dimensional space information including one or more of range coverage, azimuth coverage, elevation coverage, and Doppler coverage.

17. The system of claim 15, wherein the beam is transmitted through single waveform sequential transmitting from the one or more transmitter antennas.

18. The system of claim 15, wherein the beam is transmitted through multiple waveform simultaneous transmitting from the one or more transmitter antennas.

19. The system of claim 15, wherein the one or more receive channels each have a sub-array with at least one element.

\* \* \* \* \*